No. 727,435. PATENTED MAY 5, 1903.
C. PIETZNER.
PHOTOMECHANICAL PROCESS OF PRODUCING FINISHED
AND PLASTIC CASTS.
APPLICATION FILED AUG. 18, 1899.
NO MODEL.

Attest
Walter Donaldson
Edw. L. Reed

Inventor
Carl Pietzner
by Richards & Co
Attys

No. 727,435.                                              Patented May 5, 1903.

UNITED STATES PATENT OFFICE.

CARL PIETZNER, OF VIENNA, AUSTRIA-HUNGARY.

PHOTOMECHANICAL PROCESS OF PRODUCING FINISHED AND PLASTIC CASTS.

SPECIFICATION forming part of Letters Patent No. 727,435, dated May 5, 1903.

Application filed August 18, 1899. Serial No. 727,710. (No specimens.)

*To all whom it may concern:*

Be it known that I, CARL PIETZNER, imperial and royal court and chamber photographer, of 3 Mariahilferstrasse, Vienna VI, in the Empire of Austria-Hungary, have invented a certain new and useful Improved Photomechanical Process for the Production of Finished and Plastic Casts, of which the following is a specification.

The action of light on chromatic layers of glue is well known. The methods hitherto used for producing plastic models by means of such chromatic layers of glue have yielded only very imperfect results—that is to say, the reliefs thus obtained can only be designated as "surface" reliefs, which are of no use for utilization as plastic objects.

The new method which is the subject of the present invention yields in comparison with the above-characterized older method more perfect models, which render faithfully the artistic idea, and the individual peculiarity of the photographic original and the plastic features of it are so pronounced that their use as reliefs or with the aid of the usual mounting or casting methods as models, &c., is rendered possible in the most various branches of industry.

The present new method, as characterized regarding its results, is carried out normally in the following manner:

Approximately equal parts of agar-agar and pure gelatin are used and dissolved in as much water as is just necessary for dissolving both kinds of glue—that is to say, for the formation of a consistent mass of the same. After this mass has been mixed with three to eight per cent. chromate-of-potash solution to sensitize it in accordance with the light-and-shade effects of the figure (or body) original to be photographed it is poured in as thick a layer as possible on entirely level glass plates and then dried while the light is excluded. The plates prepared in this manner are then ready for producing the models in relief, as described hereinafter, and they are especially adapted for the purpose, because they yield a high relief capable of much resisting strength, and they are brought for the development of the latter first into lukewarm water, thereafter into warm water, and finally into water saturated with acetic acid.

Figure 1:
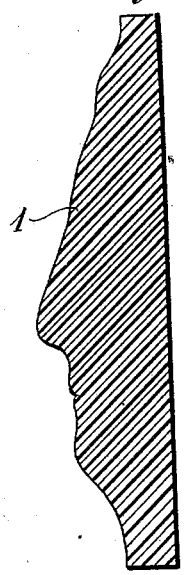
Figure 2:
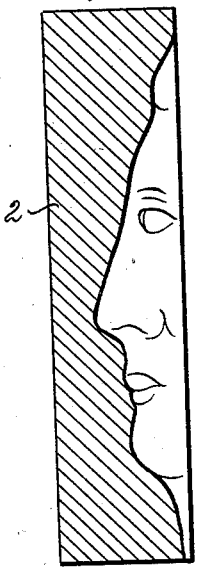
Figure 3:
Figure 4:
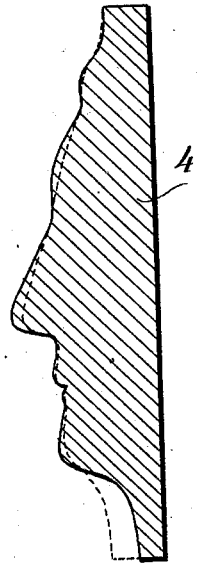
Figure 5:
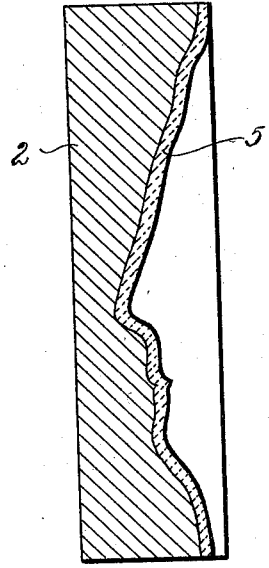
Figure 6:

In the accompanying drawings, Figure 1 is a sectional view of a positive swelled relief; Fig. 2, a similar view of a plastic cast therefrom. Fig. 3 is a negative swelled relief. Fig. 4 is a sectional view of a positive cast taken from the relief of Fig. 3. Figs. 5 and 6 are sectional views illustrating the operation.

By means of a negative picture made in any ordinary manner a positive swelled relief 1, Fig. 1, is obtained, and from this a plaster cast 2, Fig. 2, is taken, which results negative, of course, and which will be designated hereinafter as a "plastic matrix." By means of a diapositive picture made from the same original a swelled relief 3, Fig. 3, is produced, which will be negative. From this swelled relief a plastic cast 4 is taken, which results positive, Fig. 4, and which will be designated hereinafter as "plastic counter-mold." Now a thin layer 5, of clay or some other plastic mass, is pressed into the plastic matrix 2, Fig. 5. The plastic counter-mold 4, Fig. 4, is then modeled over or corrected without regard to perfect resemblance or fine detail features of the original, but with strict observance of the rules of plastic art, raising the places which are too deep by laying on some material, preferably wax or some other consistent plastic substance, while the places which become too high are deepened by scraping. (Fig. 4 shows in full outlines the plastic counter-mold corrected in this manner.) On the plastic counter-mold which has thus been retouched (Fig. 4) in its general features, the clay impression 5, made by means of the plastic matrix, is now laid, and with the aid of slight pressure the right form of height is given to it. This may also be effected in such a manner that the retouched plastic counter-mold 4, Fig. 4, is pressed from behind into the clay impression, which is still in the matrix, Fig. 5, and that the clay impression is lifted out with the plastic counter-mold and pressed on further, if necessary. In the clay impression which has thus been transferred to the plastic counter-mold parts which might have turned out too deep from the swelled relief cannot recede, but they must maintain themselves in their correct position in accordance with the corrected plastic of the underlying counter-mold. The model, Fig. 6, formed in this manner from the counter-mold and the clay impression, is retouched artistically like any other plastic model.

Having now particularly described and ascertained the nature of my said invention and in what manner the same is to be performed, I declare that what I claim is—

The herein-described method of producing plastic models which consists in producing a positive and a negative swelled relief from an original by photographic processes, forming one negative cast from the positive relief and one positive cast from the negative relief correcting the positive cast taking a thin stamp from the uncorrected cast, applying the same to the corrected cast and applying slight pressure to said stamp to give it the right form substantially as described.

In witness whereof I have hereunto set my hand in presence of two witnesses.

CARL PIETZNER.

Witnesses:
ALVESTO S. HOGUE,
AUGUST FUGGER.